Patented July 7, 1953

2,644,845

UNITED STATES PATENT OFFICE 2,644,845

HALOGENATION OF FLUOROCARBONS

Earl T. McBee, West Lafayette, Ind., assignor to Purdue Research Foundation, West Lafayette, Ind., a corporation of Indiana No Drawing. Application June 20, 1947, Serial No. 756,103

5 Claims. (Cl. 260—653)

This invention relates to halogenation and more particularly to thermal halogenation of fluorohydrocarbons.

This application is a continuation-in-part of my copending application, Serial Number 497,875, filed August 7, 1943, now abandoned.

Among the objects of this invention are the provision of methods for halogenating fluorohydrocarbons; the provision of methods for halogenating fluorohydrocarbons which are relatively difficult to halogenate; the provision of methods of the type indicated which afford products other than those customarily expected; and, the provision of methods of the type indicated which may be easily carried out to form valuable products. Other objects will be in part apparent and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Fluorine-containing compounds are customarily chlorinated in the presence of light and at a relatively low temperature, usually well below 200° C. In many instances the mono-chorinated product chlorinates at a more rapid rate than the original compound, so it is difficult to obtain a product in which only one hydrogen has been replaced by chlorine. Also in many cases the second chlorine atom replaces hydrogen on the same carbon atom as that on which the first chlorine atom entered. Generally, the chlorination is slow.

In accordance with the present invention, however, it has been found that if the chlorination is carried out at a temperature in excess of about 200° C. the tendency toward polychlorination is substantially less than when the chlorination is conducted at relatively low temperatures as is usual. Also, chlorination occurs at a satisfactory rate. This chlorination at temperatures above 200° C. may or may not be carried out in the presence of light as desired.

Compounds containing both fluorine and bromine have in general been prepared (1) by replacing a part of the bromine in the molecule with fluorine, (2) by addition of bromine or bromine chloride to a fluorine containing olefin or (3) by replacing hydroxyl groups with bromine. The methods generally applicable to this introduction of bromine into an organic molecule include formation of nascent bromine in situ, halogen exchange using aluminum bromide or sodium bromide and photo-chemical bromination at about 80° C. Frequently these methods are unsatisfactory for the introduction of bromine into fluorine containing compounds. Following these procedures, the number and variety of bromine and fluorine containing compounds which can be prepared are limited by the number of polybromo compounds available and by the number of fluorine containing olefins available.

In accordance with the present invention, however, it has been found that if a fluorine-containing compound and bromine are brought together at a temperature in excess of about 200° C., a reaction occurs in which hydrogen atoms in the molecule are replaced by bromine atoms. In this way, a variety of compounds containing both bromine and fluorine can be prepared.

The following examples illustrate the invention.

EXAMPLE 1

Chlorination of 1,1,1-trifluoropropane 1,1,1-trifluoropropane was chlorinated thermally at 365–390° C. in the presence of light from a 200 watt bulb. The reaction tube consisted of preheaters for the chlorine and trifluoropropane, a mixing tube, and a reaction tube. Chlorine and 1,1,1-trifluoropropane were passed into the preheaters at rates of flow of 10.5 and 13.2 liters per hour, respectively. The contact time was 2.7 seconds. The exit gases were passed through a low temperature rectifying column, a sodium hydroxide wash tower, and into a cold trap. 2-chloro-1,1,1-trifluoropropane (23 g.), 3-chloro-1,1,1-trifluoropropane (80 g.), boiling point 45.4° C., and 3,3-dichloro-1,1,1-trifluoropropane (25 g.), boiling point 71–72° C., were obtained.

EXAMPLE 2

Bromination of 1,1,1-trifluoropropane

Gaseous 1,1,1-trifluoropropane was allowed to bubble through liquid bromine at 6 liters per hour, and the mixed vapors were passed through a reactor tube immersed in a salt bath at 400° C., the contact time being 20–30 seconds. The products were condensed in a cold trap, washed, and dried. Rectification yielded 2-bromo-1,1,1-trifluoropropane, boiling at 48.4–49° C., 3-bromo-1,1,1-trifluoropropane, boiling at 62–62.5° C., and 3,3 - dibromo - 1,1,1 - trifluoropropane, boiling at 110–110.5° C., $d_4^{25}$ 2.086, $n_D^{26}$ 1.4242.

EXAMPLE 3

Bromination of 1,1,1-trifluoroethane

Gaseous 1,1,1-trifluoroethane was allowed to bubble through liquid bromine at 6 liters per hour, and the mixed vapors were passed through a reactor tube immersed in a salt bath at 400° C., the contact time being 20–30 seconds. The products were condensed in a cold trap. These were then scrubbed with dilute sodium hydroxide, dried and recondensed. Rectification yielded unreacted 1,1,1-trifluoroethane, 2-bromo-1,1,1-trifluoroethane, and 2,2-dibromo-1,1,1-trifluoroethane, boiling point 73° C., $d_4^{24}$ 2.224, $n_D^{26}$ 1.4029.

EXAMPLE 4

*Bromination of 1-chloro-1,1-difluoropropane*

Gaseous 1-chloro-1,1-difluoropropane was allowed to bubble through liquid bromine, and the mixed vapors were passed through a reactor tube immersed in a salt bath at 400° C., the contact time being 20–30 seconds. The products were condensed in a cold trap. These were then washed with dilute sodium hydroxide solution, dried and rectified. Unreacted starting material, 2-bromo-1-chloro-1,1-difluoropropane, 3-bromo-1-chloro-1,1-difluoropropane, boiling point 100–101° C., $d_4^{24}$ 1.726, $n_D^{26}$ 1.4140 and some higher boiling residue were obtained.

EXAMPLE 5

*Bromination of 2-chloro-1,1,1-trifluoropropane*

Gaseous 2-chloro-1,1,1-trifluoropropane was allowed to bubble through liquid bromine at 45° C., and the mixed vapors passed through a reactor tube immersed in a salt bath at 450° C., the contact time being 20–30 seconds. The products were caught under ice water, washed, dried and rectified. Unreacted starting material, 2-bromo-2-chloro-1,1,1-trifluoropropane, boiling point 69° C., $n_D^{24}$ 1.379, $d_4^{25}$ 1.708 and some higher boiling residue were obtained.

EXAMPLE 6

*Chlorination of 1,1,1-trifluoroethane*

A reactor was constructed from 6.5 meters of 8 mm. Pyrex tubing by winding it in the form of a helix 15 cm. in diameter (volume of reactor, 185 ml.). This reactor was immersed in an electrically heated salt bath, the temperature of which was controlled by a variable resistance. Reactants were introduced through a Y-tube at rates measured by flowmeters. The reaction product was passed into a rectifying column maintained at a temperature sufficiently reduced to condense any chlorinated materials. Products of the chlorination were collected in a receiver at the bottom of the column, while unreacted starting material passed through the column into a scrubbing tower, through a drying tower, and into a cooled receiver. In one instance 1,1,1-trifluoroethane and chlorine were introduced into the reactor at 497° C. at a rate of 0.67 mole per hour, and 0.76 mole per hour, respectively. The product which was obtained after 7 hours of chlorination weighed 534 grams. Upon rectification it was found to contain 56 g. of 2-chloro-1,1,1-trifluoroethane, 105 g. of 2,2-dichloro-1,1,1-trifluoroethane, 176 grams of 2,2,2-trichloro-1,1,1-trifluoroethane and 197 g. of unreacted 1,1,1-trifluoroethane. This represents a conversion to chlorine containing products of 45%.

Reducing the time of contact increases the percentage of 2-chloro-1,1,1-trifluoroethane in the product.

EXAMPLE 7

*Chlorination of 1,2-dichloro-1,1-difluoroethane*

The apparatus and techniques used in this chlorination was similar to those described in Example 6. Chlorine and 1,2-dichloro-1,1-difluoroethane were introduced into the reactor at 420° C. at rates of 0.78 mole per hour and 0.73 mole per hour, respectively. The product which collected after 5.33 hours of chlorination was found to contain 1,2-dichloro-1,1-difluoroethane, 1,2,2-trichloro-1,1-difluoroethane, 1,2,2,2-tetrachloro-1,1-difluoroethane, 1,1-difluoroethene, 2,2-dichloro-1,1-difluoroethene and unreacted 1,2-dichloro-1,1-difluoroethane.

Increasing the temperature, other things being equal, increases the percentages of olefins obtained in the product.

EXAMPLE 8

*Bromination of 1,1,1-trifluoropropane*

1,1,1-trifluoropropane (256 g., 2.61 moles) was bubbled through liquid bromine maintained at 35–40° C. The mixed vapors were passed into a reactor maintained at 450° C. This reactor was constructed from a four foot length of 12 mm. Pyrex tubing bent in the shape of a U and had a volume of 95.6 ml. The reactor was heated by two Carius tube furnaces two feet in length. Gases issuing from the reactor passed into one liter of ice water wherein the brominated products collected. Unreacted trifluoropropane, along with a small amount of brominated products, passed from the water scrubber to a calcium chloride drying tower and was condensed in a receiver cooled with a Dry Ice-trichloroethylene mixture. The brominated products were separated from the ice water, washed, dried and rectified. Unreacted trifluoropropane was rectified before recycling.

2-bromo-1,1,1-trifluoropropane, 3-bromo-1,1,1-trifluoropropane and 3,3-dibromo-1,1,1-trifluoropropane were obtained in yields of 17.6%, 34.3% and 19.0%, respectively.

EXAMPLE 9

*Bromination of 2-chloro-1,1,1-trifluoropropane*

2-chloro-1,1,1-trifluoropropane (46 g.; 0.34 mole) was passed into bromine at 45–50° C. The mixed vapors were led into the reactor described in Example 8 and maintained at 450° C. The time required was two hours. The products were collected and purified as described previously. Upon rectification there was obtained 2-bromo-2-chloro-1,1,1-trifluoropropane and 3-bromo-2-chloro-1,1,1-trichloropropane.

EXAMPLE 10

*Bromination of 1,1,1,3,3,3-hexafluoropropane*

1,1,1,3,3,3-hexafluoropropane was brominated in a manner similar to that described in the preceding example. The temperature of the reactor was maintained at 550–585° C. Material boiling above room temperature was recycled. 2-bromo-1,1,1,3,3,3-hexafluoropropane, boiling at 31.5–32.5 was isolated from the material boiling above room temperature.

EXAMPLE 11

*Bromination of 1,1,1-trifluoroethane*

The center section (about 30 cm.) of a Vycor combustion tube, 60 cm. long and 2 cm. in diameter, was packed with glass beads (0.6 cm. in diameter). The glass beads were held in place by glass wool plugs. The tube was then placed in a 30 cm. tube-furnace and its position adjusted so that the packed section was in the "hot" zone. The tube was heated to 600° C. and a mixture of 1,1,1-trifluoroethane and bromine was passed into the reaction zone. The exit gases were led into a scrubber containing a 15% sodium hydroxide solution. Material which did not react with the sodium hydroxide and which did not condense in the scrubber was collected in a receiver cooled by Dry Ice. During a period of 7.5 hours, 120 g. of 1,1,1-trifluoroethane and 600 g. of bromine were introduced into the reaction zone. Upon rectification in a suitable column, there was obtained, 2-bromo-1,1,1-trifluoroethane, 2,2-dibromo-1,1,1-trifluoroethane and 2,2,2-tribromo-1,1,1-trifluoroethane.

In a manner similar to the above, trifluoromethane was converted to bromotrifluoromethane.

EXAMPLE 12

*Bromination of 1,1,1-trifluoroethane*

The $CH_3CF_3$ was released through a needle valve from a small steel bomb and bubbled through boiling bromine. The bromine container was a tall Pyrex gas washing bottle, the lower portion of which was placed in a pan of hot water. The mixed vapors were conducted to a combustion tube furnace fitted with a 2 cm. diameter Vycor combustion tube. The hot zone was 12 inches long and was packed with one fourth inch glass beads. Small glass wool plugs held the beads in place. The temperature of the furnace was controlled at 600° C. ± 20° by a Variac. The exit gases were bubbled through two liters of aqueous 15 per cent. NaOH. This scrubber removed the excess of bromine, hydrobromic acid and, in addition, the higher boiling products were condensed. The low boiling gases passing through the alkaline scrubber were dried in a calcium chloride tower and finally condensed in a trap cooled with Dry Ice. In this manner, 120 g. of $CH_3CF_3$ was brominated over a period of 7.5 hours. A quantity of 600 g. of bromine was consumed. The rate of flow of $CH_3CF_3$ was held constant by observing the rate of bubbles produced in the caustic scrubber. The material in the Dry Ice trap was rectified in a 90 cm. cold temperature column. The recovery of $CHCF_3$, B. P., −39.5° C., was 23 g. The pot residue was combined with the product obtained from the caustic scrubber by steam distillation. Three compounds were obtained by rectification:

$CF_3CH_2Br$; B. P., 25.4° C.; yield, 10.2%; conversion, 8.38%.

$CF_3CHBr_2$; B. P., 71.5° C.; yield, 30.7%; conversion, 22.6%.

$CF_3CBr_3$; B. P., 113.1° C.; yield, 15.2%; conversion, 7.74%.

Anal.: Calcd. for $CF_3CBr_3$: Br, 74.6; F, 17.8. Found: Br, 77.4, 76.6; F, 16.8, 16.6; F. P., 67.5°.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

I claim:

1. The process which comprises: heating a 1,1,1-trihalogenated alkane containing from 2 to 3 carbon atoms, at least two of the halogen atoms being fluorine, with a halogen selected from the group consisting of chlorine and bromine, for a contact time between 2.7 and 30 seconds, in the vapor phase, under anhydrous conditions, at a reaction temperature between about 365 and 450 degrees centigrade, the volume proportion of halogen to trihaloalkane being between 0.8:1 and that proportion of halogen required to physically saturate the trihaloalkane at 45 degrees centigrade, and separating the reaction products.

2. The process which comprises: passing gaseous 1,1,1-trifluoropropane through liquid bromine at a rate of approximately 6 liters per hour, thereafter heating the mixed vapors at about 400 degrees centigrade, in an inert reactor, at a contact time between 20 and 30 seconds, and separating monobromo- and dibromo-reaction products from the resulting mixture.

3. The process which comprises: passing gaseous 1,1,1-trifluoroethane through liquid bromine at a rate of approximately 6 liters per hour, heating the mixed vapors at about 400 degrees centigrade, in an inert reactor, at a contact time between 20 and 30 seconds, and separating monobromo- and dibromo-reaction products from the resulting mixture.

4. The process which comprises: passing gaseous 1-chloro-1,1-difluoropropane through liquid bromine at a rate of approximately 6 liters per hour, thereafter heating the mixed vapors at about 400 degrees centigrade, in an inert reactor, at a contact time between 20 and 30 seconds, and separating monobromo- and dibromo-reaction products from the resulting mixture.

5. The process which comprises heating a mixture of 1,1,1-trifluoropropane and chlorine in the vapor phase under anhydrous conditions at from 365° to 390° C. in an inert reactor at a contact time of 2.7 seconds, employing a volume ratio of chlorine to trifluoropropane of about 0.8 to 1, and separating the products.

EARL T. McBEE.

References Cited in the file of this patent

UNITED STATES PATENTS

| Number | Name | Date |
|---|---|---|
| 2,004,072 | Hass et al. | June 4, 1935 |
| 2,324,248 | Vaughan et al. | July 13, 1943 |
| 2,407,246 | Benning et al. | Sept. 16, 1946 |
| 2,417,059 | Calfee et al. | Mar. 11, 1947 |
| 2,459,767 | Calfee et al. | Jan. 18, 1949 |
| 2,499,629 | Calfee | Mar. 7, 1950 |

OTHER REFERENCES

Collie: Jour. Chem. Soc., vol. LV, 110-13 (1889).

Van der Linden, Recueil trav. chim., vol. 55, 282-84 (1936).

Henne et al.: Jour. Am. Chem. Soc., vol. 61, 938-40 (1939).

Henne et al.: Jour Am. Chem. Soc., vol. 64, 1157-9 (1942).

McBee et al.: Jour. Am. Chem. Soc., vol. 62, 3340-1 (1940).